United States Patent
Stepan et al.

(10) Patent No.: US 10,515,213 B2
(45) Date of Patent: Dec. 24, 2019

(54) DETECTING MALWARE BY MONITORING EXECUTION OF A CONFIGURED PROCESS

(71) Applicant: Microsoft Technology Licensing, LLC, Redmond, WA (US)

(72) Inventors: Adrian Emil Stepan, Bellevue, WA (US); Adrian M. Marinescu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 232 days.

(21) Appl. No.: 15/249,366

(22) Filed: Aug. 27, 2016

(65) Prior Publication Data

US 2018/0060579 A1 Mar. 1, 2018

(51) Int. Cl.
| | |
|---|---|
| *G06F 21/00* | (2013.01) |
| *G06F 21/56* | (2013.01) |
| *G06F 21/53* | (2013.01) |
| *G06F 21/55* | (2013.01) |
| *G06F 21/54* | (2013.01) |

(52) U.S. Cl.
CPC .......... *G06F 21/562* (2013.01); *G06F 21/53* (2013.01); *G06F 21/54* (2013.01); *G06F 21/55* (2013.01); *G06F 21/552* (2013.01)

(58) Field of Classification Search
None
See application file for complete search history.

(56) References Cited

U.S. PATENT DOCUMENTS

| | | | |
|---|---|---|---|
| 8,566,944 B2 | 10/2013 | Peinado et al. | |
| 8,875,294 B2 | 10/2014 | Golavanov | |
| 9,032,526 B2 | 5/2015 | Wang et al. | |
| 9,152,789 B2 | 10/2015 | Natarajan et al. | |
| 9,245,114 B2 | 1/2016 | Thomas et al. | |
| 2008/0016572 A1 | 1/2008 | Burkhardt et al. | |

(Continued)

OTHER PUBLICATIONS

Alme, et al., "McAfee® Anti-Malware Engines: Values and Technologies", Retrieved on: Jun. 29, 2016 Available at: https://kc.mcafee.com/resources/sites/MCAFEE/content/live/PRODUCT_DOCUMENTATION/25000/PD25219/en_US/mcafee_engine_technologies.pdf, 21 pages.

(Continued)

*Primary Examiner* — Andrew J Steinle

(57) ABSTRACT

Described herein are various technologies pertaining detecting malware by monitoring execution of an instrumented process. An anti-malware engine can observe code obfuscation, suspicious patterns and/or behavior upon scanning a computer file. Based upon this observation, evidence can be submitted to a service (e.g., cloud-based service) and, in response, configuration setting(s) for restraining, containing and/or instrumenting a process for executing the file and/or instrumenting a process into which the file is loaded can be received. The configured process can be monitored. Based upon this monitoring, an action can be taken including determining the file to comprise malware and terminating the process. Upon detecting malware, a detection report, and a copy of the computer file, can be sent to a service (e.g., cloud-based). The service can independently verify that the reported file is malicious, and can protect other machines from executing or loading the same malicious file.

20 Claims, 6 Drawing Sheets

(56) References Cited

U.S. PATENT DOCUMENTS

| | | | |
|---|---|---|---|
| 2009/0158432 A1* | 6/2009 | Zheng | G06F 21/562 |
| | | | 726/24 |
| 2010/0031353 A1 | 2/2010 | Thomas et al. | |
| 2011/0041179 A1 | 2/2011 | St Hlberg | |
| 2012/0102568 A1 | 4/2012 | Tarbotton et al. | |
| 2012/0255031 A1* | 10/2012 | Sallam | G06F 21/53 |
| | | | 726/27 |
| 2014/0115652 A1* | 4/2014 | Kapoor | G06F 21/554 |
| | | | 726/1 |
| 2014/0143869 A1 | 5/2014 | Pereira et al. | |
| 2014/0259171 A1 | 9/2014 | Spikes et al. | |
| 2014/0359774 A1 | 12/2014 | Pulapaka et al. | |
| 2015/0089647 A1* | 3/2015 | Palumbo | H04L 63/145 |
| | | | 726/23 |
| 2015/0319182 A1* | 11/2015 | Natarajan | G06F 21/53 |
| | | | 726/24 |
| 2017/0192810 A1* | 7/2017 | Lukacs | G06F 9/44526 |

OTHER PUBLICATIONS

Ehsan, Fahad, "Memory Forensics & Security Analytics: Detecting Unknown Malware", In Proceedings of RSA Conference, Jul. 22, 2014, pp. 1-24.

* cited by examiner

DETECTING MALWARE BY MONITORING EXECUTION OF A CONFIGURED PROCESS

BACKGROUND

Computer software distributed by various individuals and/or organizations with malicious intent is referred to as "malware". Malware can, for example, damage computer systems and/or be used to steal personal information of users. Malware typically exploits code vulnerabilities and/or is surreptitiously installed by a user unintentionally.

Anti-malware detects known malware and prevents users from loading the known malware. Conventionally, when a user tries to access a file, the access is intercepted and the file is inspected to check for presence of malware by checking against code patterns in a database of known malicious patterns. Further, for executable or script code, the file execution can be simulated inside a virtual environment, and behavior of the simulated file execution observed. Access to the file is blocked if malware is detected; otherwise, normal access to the file is allowed.

Unfortunately, as anti-malware evolves to detect the ever changing malware, individuals and/or organizations with malicious intent continue to create malware which conventional anti-malware is unable to timely detect.

SUMMARY

Described herein is a system and methods for detecting malware by monitoring execution of a configured process. The system can include an anti-malware engine and anti-malware driver executing on a client computer. The anti-malware engine can observe code obfuscation, suspicious patterns and/or suspicious behavior upon scanning a file. Based upon this observation, evidence can be submitted to a service (e.g., cloud-based service) and, in response, configuration setting(s) can be received from the service.

In one example, configuration setting(s) can comprise information regarding containment and/or restricted execution of a process for executing the file and/or into which the file is loaded. Execution of the process can be contained and/or restricted based upon the received configuration setting(s). Execution of the contained and/or restricted process can be monitored by the anti-malware engine and based upon this monitoring, the file can be determined to comprise malware. For example, the anti-malware engine can provide a detection report to the service and/or client machine in response to determining that the contained and/or restricted process comprises malware.

In one example, the configuration setting(s) can comprise instructions for instrumenting a process for executing the file (e.g., executable file) and/or instructions for instrumenting a process into which the file (e.g., document) is loaded. Instrumenting a process can include, for example, injecting additional code prior to specific point(s) in execution of the file in the process. The instrumented process can be monitored and based upon this monitoring, the file can be determined by the anti-malware engine and/or the service to comprise malware. For example, the anti-malware engine can provide a detection report to the service and/or client machine in response to determining that the instrumented process comprises malware.

In one example, in response to receiving the detection report from the anti-malware engine, the service can request the anti-malware engine to provide access to the file (e.g., by uploading the file to the service), for further analysis by the service. For example, the further analysis can be performed in order to independently confirm the malware detection observed by the anti-malware engine. In this manner, impersonation of the anti-malware engine and corresponding spoofed detection report(s) by a malicious attacker can be detected.

The service can analyze the file and the file can be executed in a controlled environment. If malware is detected in file executing in the controlled environment, the service can identify the file as malware. In one example, the file and/or pattern(s) associated with the file are added to a database of known malware which is then available for use when the service is queried by other client computer(s).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
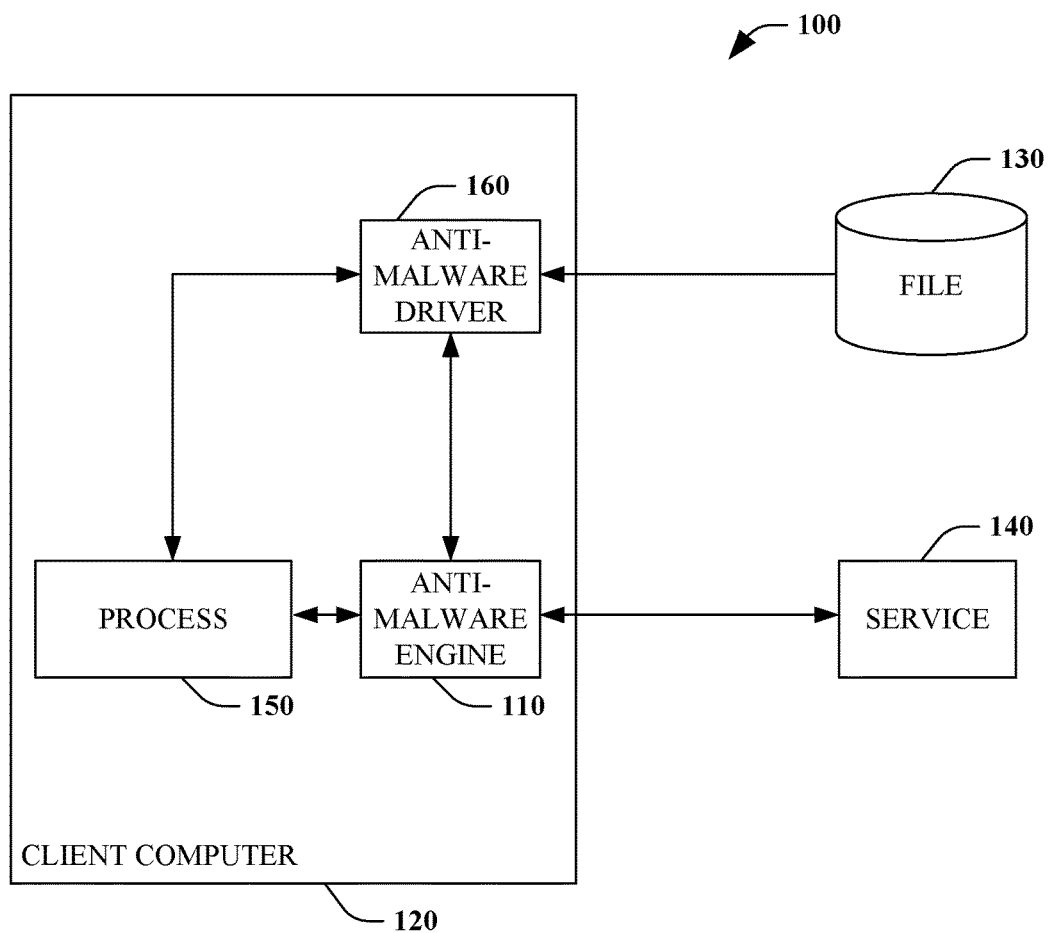
FIG. 1 is a functional block diagram that illustrates a system for detecting malware by monitoring execution of a configured process.

Various technologies pertaining to detecting malware by monitoring execution of a configured process are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding detecting malware by monitoring execution of a configured process. What follows are one or more exemplary systems and methods.

Aspects of the subject disclosure pertain to the technical problem of detecting a computer file as malware. The technical features associated with addressing this problem involve observing code obfuscation, suspicious patterns and/or behavior upon scanning the computer file. Based upon this observation, evidence is submitted to a service and, in response, configuration setting(s) may be received from the service. For example, the configuration setting(s) can comprise instructions for instrumenting a process for executing the file and/or instructions for instrumenting a process into which the file is loaded. The instrumented process is monitored and based upon this monitoring, the file can be determined to comprise malware. Accordingly, aspects of these technical features exhibit technical effects of detecting that the computer file comprises malware.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Referring to FIG. 1, a system for detecting malware by monitoring execution of a configured process 100 is illustrated. An anti-malware engine 110 executing on a client computer 120 can observe code obfuscation, suspicious patterns and/or suspicious behavior upon scanning a file 130. Based upon this observation, evidence can be submitted to a service 140 (e.g., cloud-based service) and, in response, configuration setting(s) are received from the service 140.

In one example, configuration setting(s) can comprise information regarding containment and/or restricted execution of a process 150 for executing the file and/or into which the file is loaded. Execution of the process 150 can be contained and/or restricted based upon the received configuration setting(s). Execution of the contained and/or restricted process 150 can be monitored by the anti-malware engine 110 and based upon this monitoring, the file 130 can be determined to comprise malware. For example, the anti-malware engine 110 can provide a detection report to the service 140 and/or client machine in response to determining that the contained and/or restricted process 150 comprises malware.

In one example, the configuration setting(s) can comprise instructions for instrumenting a process 150 for executing the file (e.g., executable file) and/or instructions for instrumenting the process 150 into which the file (e.g., document file) is loaded. In one example, instrumenting a process comprises injecting additional code prior to specific point(s) in execution of the file in the process 150. The instrumented process 150 can be monitored and based upon this monitoring, the file 130 can be determined by the anti-malware engine 110 and/or the service 140 to comprise malware.

The system 100 includes the client computer 120 and includes an anti-malware engine 110 configured to facilitate detection of malware. In one example, the anti-malware engine 110 executes within an application execution area of memory (e.g., non-protected area of memory). The client computer 120 can further include an anti-malware driver 160 configured to facilitate detection of malware in cooperation with the anti-malware engine 110. In one example, the anti-malware driver 160 executes within a protected area of the operating system known as the "kernel".

The operating system can load the file 130 into the process 150 and notify the anti-malware driver 160 when the file 130 has been loaded into the process 150. The anti-malware driver can intercept the file 130 prior to execution of the file 130 on the client computer 120. In response to interception by the anti-malware driver 160, the anti-malware engine 110 can scan the file 130. Upon scanning the file 130, the anti-malware engine 110 can determine whether code obfuscation, suspicious pattern(s) and/or suspicious behavior are observed.

Conventional malware detection approaches can present challenges when malware is obfuscated (e.g., using code obfuscation). Frequently, code is encrypted which renders searching for code patterns ineffective. Further, malware can take advantage of limitations in a virtual environment such that the malware is designed to not execute properly in the virtual environment. These limitations include, for example, inaccurate and/or incomplete simulation of central processing unit and/or operating system functionality, memory usage and/or analysis time constraints, etc.

In one example, code obfuscation in an application is deemed suspicious by the system 100 such that its presence may suggest that an application is potentially malicious. However, in many cases, the presence of obfuscation alone is not sufficient to determine a file as being malicious as many non-malicious applications can use obfuscation for legitimate reasons (e.g., to prevent reverse engineering, etc.).

If, upon scanning the file 130, code obfuscation, suspicious pattern(s) and/or suspicious behavior are observed, the anti-malware engine 110 can collect evidence of the observed obfuscation, suspicious pattern(s) and/or suspicious behavior(s) and assemble a report which is then provided to the service 140. In addition to the collected evidence, the report can include an identifier code (e.g., strong cryptographic hash) to uniquely identify the file 130.

Based upon the determination that obfuscation, suspicious pattern(s) and/or suspicious behavior were observed by the anti-malware engine 110, access to the file 130 can be suspended by the anti-malware driver 160. In one example, the process 150 is suspended until a response is received from the service 140 and/or a timeout expires. In this example, the timeout provides a failsafe in case the service 140 fails to respond (e.g., due to connectivity issues and/or unavailability of the service 140). In one example, the service 140 is a cloud-based service that communicates with the anti-malware engine 110 via a network such as the Internet.

In response to receiving the report, the service 140 can analyze the evidence provided in the report to determine an action to be taken by the anti-malware engine 110. For example, one or more evaluators can run as part of the service 140 to analyze the evidence from the report. Further, a database can be queried based on the unique file identifier included in the report (e.g., to determine whether the file has been determined to comprise malware). A determination of the file comprising malware can be based upon analysis of the file 130 by the service 140, for example, by human researcher(s) or automation such as software process(es) that inspect the file statically (e.g., search for known malicious code pattern(s)) and/or dynamically (e.g., execute the file in a controlled environment, such as a virtual machine, and scan for malicious behavior and/or code pattern(s) that can only be observed during execution of the file).

In one example, based upon the file identified in the report, the service 140 can determine: (A) the file is malicious; (B) to allow the file to be loaded and/or executed (e.g., the file is clean and/or the service 140 is aware of other client(s) having instrumented the process without detecting the presence of malware); and/or (C) the service 140 does not have information about the file 130 to make a determination. If the file is determined to be malicious (e.g., known malware), the service 140 can send instructions (e.g., a real-time signature) to the anti-malware engine 110 to block access to the file 130. In one example, if the file is determined to be clean (e.g., known to be not malware), the service 140 can send instructions to the anti-malware engine to allow normal access to the file 130. In one example, if the file is determined to be clean and/or the service 140 is aware of other client(s) having configured and/or instrumented the process without detecting the presence of malware, the service 140 does not provide any instructions. In this scenario, the anti-malware engine 110 can infer the file 130 to be clean by default and allow the file 130 to be executed.

Finally, if the service 140 does not have information about the file 130, that is, the service 140 is unable to determine whether the file 130 is malware or clean, the service 140 can provide instructions to the anti-malware engine 110 regarding configuration setting(s). In one example, configuration setting(s) can comprise information regarding containment and/or restricted execution of the process 150 for executing the file and/or into which the file is loaded. Execution of the process 150 can be contained and/or restricted based upon the received configuration setting(s). Execution of the contained and/or restricted process 150 can be monitored by the anti-malware engine 110 and based upon this monitoring, the file 130 can be determined to comprise malware. For example, the anti-malware engine 110 can provide a detection report to the service 140 and/or client machine in response to determining that the contained and/or restricted process 150 comprises malware.

In one example, the configuration setting(s) can comprise configuration metadata that specifies type(s) of monitoring and/or amounts of instrumentation to be performed on the file 130. In one example, the instructions can be specified by a real-time signature that comprises the unique identifier of the file and configuration metadata specifying type(s) and/or amount(s) of monitoring that should be performed on the file 130 (e.g., maximum size of memory to be scanned, maximum amount of time to spend inspecting a process, etc.). When the anti-malware engine 110 has identified the threshold quantity of known suspicious pattern(s), the anti-malware engine 110 can determine the file 130 comprises malware.

In the scenario in which the service 140 has no other information about the file 130, in response to receiving instructions from the service 140, the anti-malware engine 110 can restrict, contain and/or instrument the process 150 according to the configuration setting(s) received from the service 140. For example, instrumenting the process 150 can comprise injecting additional code prior to specific point(s) in execution of the file 130 in the process 150. This instrumentation can trigger notification(s) when the process 150 is about to perform and/or has performed certain action(s) (e.g., calling particular system function(s) such as API call(s)). The instrumented process 150 can be monitored and based upon this monitoring, the file 130 can be determined by the client computer 120 and/or the service 140 to comprise malware.

Once the process 150 has been configured (e.g., restricted, contained and/or instrumented), the anti-malware engine 110 instructs the anti-malware driver 160 to allow execution of the configured process 150. The anti-malware engine 110 then listens for notification(s) triggered by the configured process 150.

Thereafter, the anti-malware engine 110 performs action(s) including, for example, the anti-malware engine 110 can enumerate range(s) of memory page(s) which are mapped into the process 150. The anti-malware engine 110 can select certain memory page(s) and search (e.g., scans) the contents of the select memory page(s) against known malicious code patterns (e.g., stored in a database). As an optimization, the anti-malware engine 110 can keep track of memory page(s) that have been searched (e.g., scanned). In order to unnecessarily rescan memory page(s), the anti-malware engine 110 can avoid (e.g., skip) rescanning memory page(s) when contents of the memory page(s) have not changed since the previous scan.

In one example, another action that the anti-malware engine 110 can take is to extract and log information related to an API call which triggered the notification. For example, extraction and logging may include details such as: API name, API parameters, stack trace (e.g., addresses of API callers). This logged information can be used to identify known malicious behavior pattern(s) and/or to adjust a way in which the process 150 is monitored (e.g., enable or disable notification(s) for various API calls, adjust a selection of memory page(s) to be scanned, etc.).

Another example action that the anti-malware engine 110 can take is to prevent the API call from being executed and/or change a result of the API call. Yet another example action that the anti-malware engine 110 can take is to enable or disable notification(s) for a current API call, other API calls, and/or all API calls.

If malware is detected in the configured process 150 by the anti-malware engine 110 by, for example, memory scan(s), logged information, matching a known malicious code pattern and/or observing malicious behavior, the anti-malware engine 110 can take an action. For example, the action taken by the anti-malware engine 110 can be based upon configuration setting(s) received from the service 140. In one example, the anti-malware engine 110 can report and/or remediate the malware (e.g., immediately), for example, by terminating the malicious process 150 and/or performing other remediation step(s) (e.g., deleting the file, removing a registry key that the process added, restoring a change to a system setting that the file changed, etc.), as needed, depending on the malware. In one example, the anti-malware engine 110 can assemble a detection report containing information regarding execution of the file 130 in the configured process 150. For example, the detection report can include a file unique identifier, a unique identifier for a signature (e.g., known pattern) which triggered the detection and/or a detection method (e.g., to inform the service 140 that malware was detected using a particular methodology) and the like. This detection report can be sent to the service 140. In one example, the process 150 is allowed to continued execution.

In one example, in response to receiving the detection report from the anti-malware engine 110, the service 140 can request the anti-malware engine 110 to provide access to the file 130 (e.g., by uploading the file 130 to the service 140), for further analysis by the service 140. For example, the further analysis can be performed in order to independently confirm the malware detection observed by the anti-malware engine 110. In this manner, impersonation of the anti-malware engine 110 and corresponding spoofed detection report(s) by a malicious attacker can be detected.

The service 140 can analyze the file 130 and the file 130 can be executed in a controlled environment, for example, a specially provisioned virtual machine ("analysis machine"). The analysis machine can include an anti-malware engine and an anti-malware driver with the file 130 executing within an instrumented process, similar to those described above. If malware is detected in the instrumented process executing on the analysis machine (e.g., confirming malware detection report received from anti-malware engine 110), the service 140 can identify the file 130 as malware. In one example, the file 130 and/or pattern(s) associated with the file are added to a database of known malware which is then available for use when the service 140 is queried by other client computer(s).

FIGS. 2-5 illustrate exemplary methodologies relating to detecting malware by monitoring execution of a configured process. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 2:
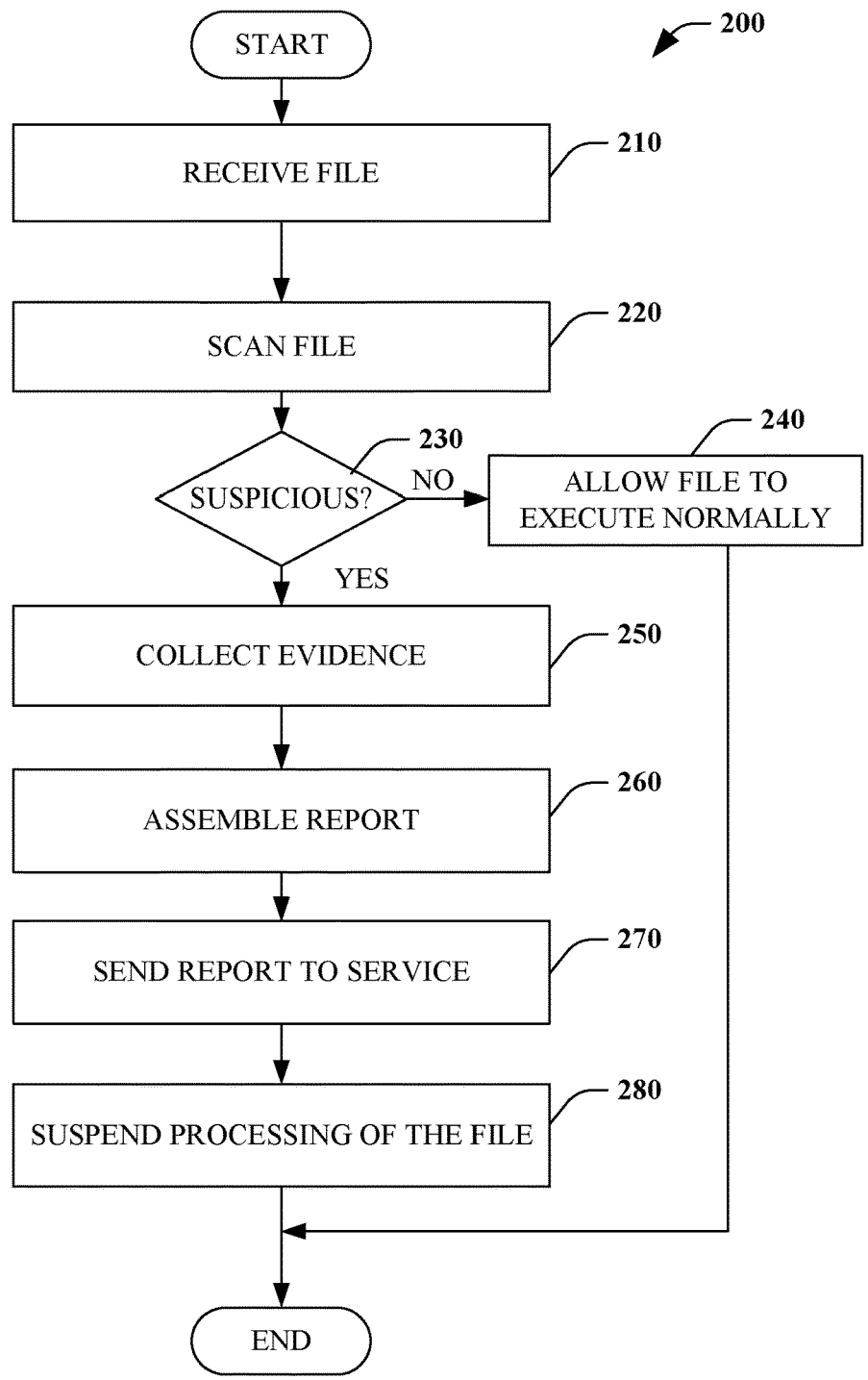
FIG. 2 illustrates an exemplary methodology of generating a report of a suspicious file on a client computer.

Referring to FIG. 2, an exemplary methodology 200 of generating a report of a suspicious file on a client computer is illustrated. At 210, a file is received. At 220, the file is scanned to determine whether or not the file is suspicious. For example, the file can be determined to be suspicious if code obfuscation, suspicious pattern(s) and/or suspicious behavior are observed. The file can be intercepted by an anti-malware driver prior to a user being able to access the file and/or execute the file.

At 230, a determination is made as to whether the file is suspicious. If the determination at 230 is NO, processing continues at 240 where the file is allowed to execute normally, and, no further processing occurs. If the determination at 230 is YES, at 250, evidence to support the determination of the file being suspicious (e.g., of the observed obfuscation, suspicious pattern(s) and/or suspicious behavior(s)) is collected. At 260, a report is assembled (e.g., generated) based on the file and the collected evidence.

Next, at 260, the report is provided to a service (e.g., cloud-based service). At 270, processing of the file is suspended. The file can be suspended until the service responds to the report and/or a pre-defined time elapses (e.g., timeout period).

Figure 3:
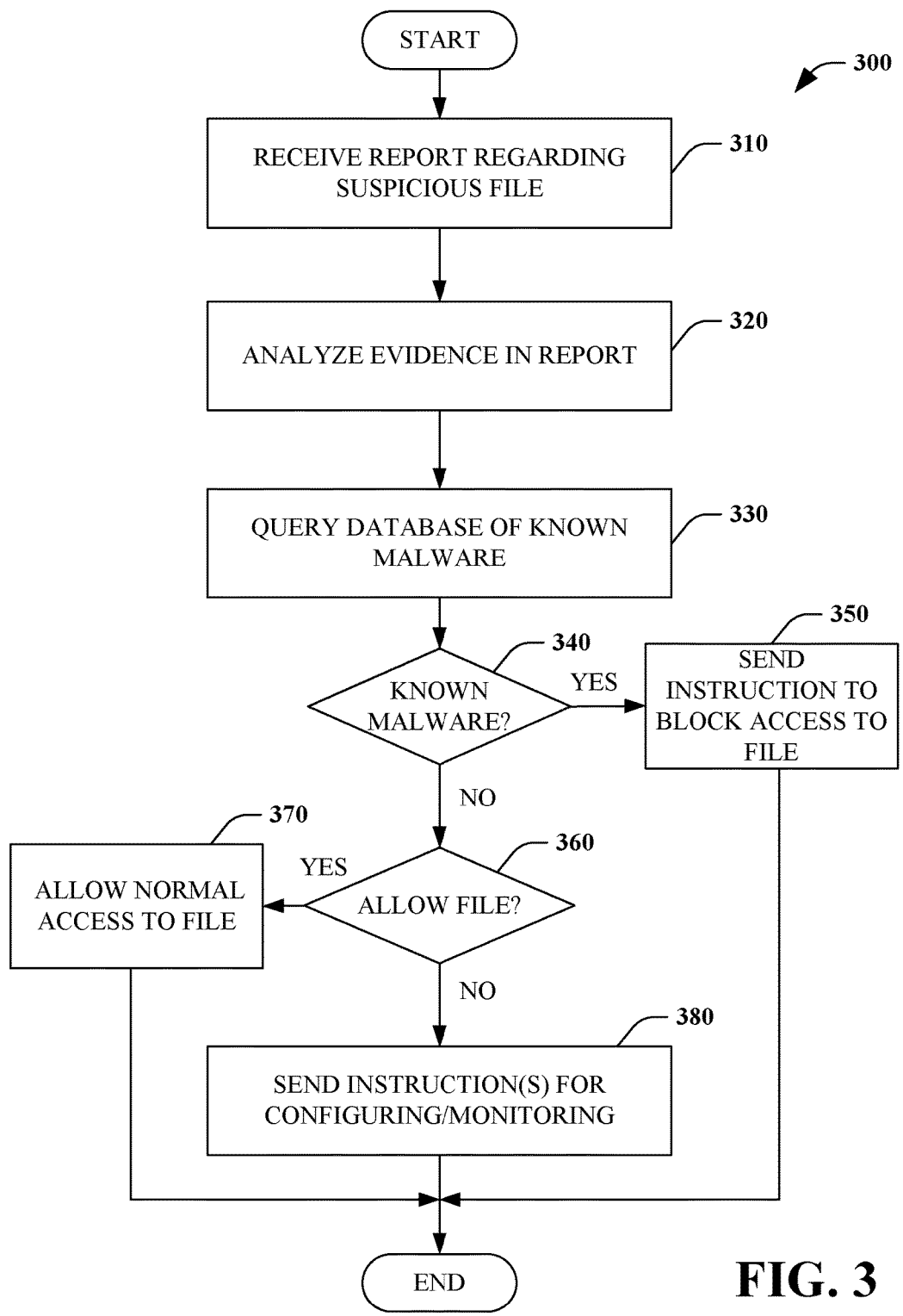
FIG. 3 illustrates an exemplary methodology of processing a report of a suspicious file at a service.

Referring next to FIG. 3, an exemplary methodology 300 of processing a report of a suspicious file at a service is illustrated. At 310, a report regarding a suspicious file is received, for example, from a client computer. For example, the report can include evidence to support a determination of the file being suspicious (e.g., of the observed obfuscation, suspicious pattern(s) and/or suspicious behavior(s)).

At 320, evidence in the report is analyzed to determine an action to be taken by an anti-malware engine of, for example, the client computer. The analysis can include one or more evaluators running as part of the service to analyze the evidence from the report. Further, at 330, a database can be queried based on a unique file identifier included in the report (e.g., to determine whether the file has been determined to comprise malware).

At 340, a determination is made as to whether the file is known malware. If the determination at 340 is YES, at 350, the service can send instructions (e.g., a real-time signature) to the anti-malware engine of the client computer to block access to the file, and, no further processing occurs.

If the determination at 340 is NO, at 360, a determination is made as to whether to allow the file (e.g., known clean file and/or a threshold quantity of other anti-malware client(s) have already been instructed to instrument the file (e.g., without a determination of malware)). If the determination at 360 is YES, at 370, the service can allow normal access to the file. In one example, the service can send instructions to the anti-malware engine to allow normal access to the file. In one example, the service does not provide any instructions and suspension of the file by the anti-malware engine is allowed to timeout.

If the determination at 360 is NO, at 380, instructions can be sent to the anti-malware engine of the client computer regarding configuring (e.g., restricting, containing and/or instrumenting) and/or monitoring of execution of the file. For example, the instructions can include configuration metadata that specifies type(s) of instrumenting and/or monitoring to be performed on the file. For example, the instructions can be specified by a real-time signature that comprises the unique identifier of the file and configuration metadata specifying type(s) of monitoring that should be performed on the file. In one example, an evaluator of the service can update a database by incrementing a count of instrumentation request(s) that have been sent for the file.

Figure 4:
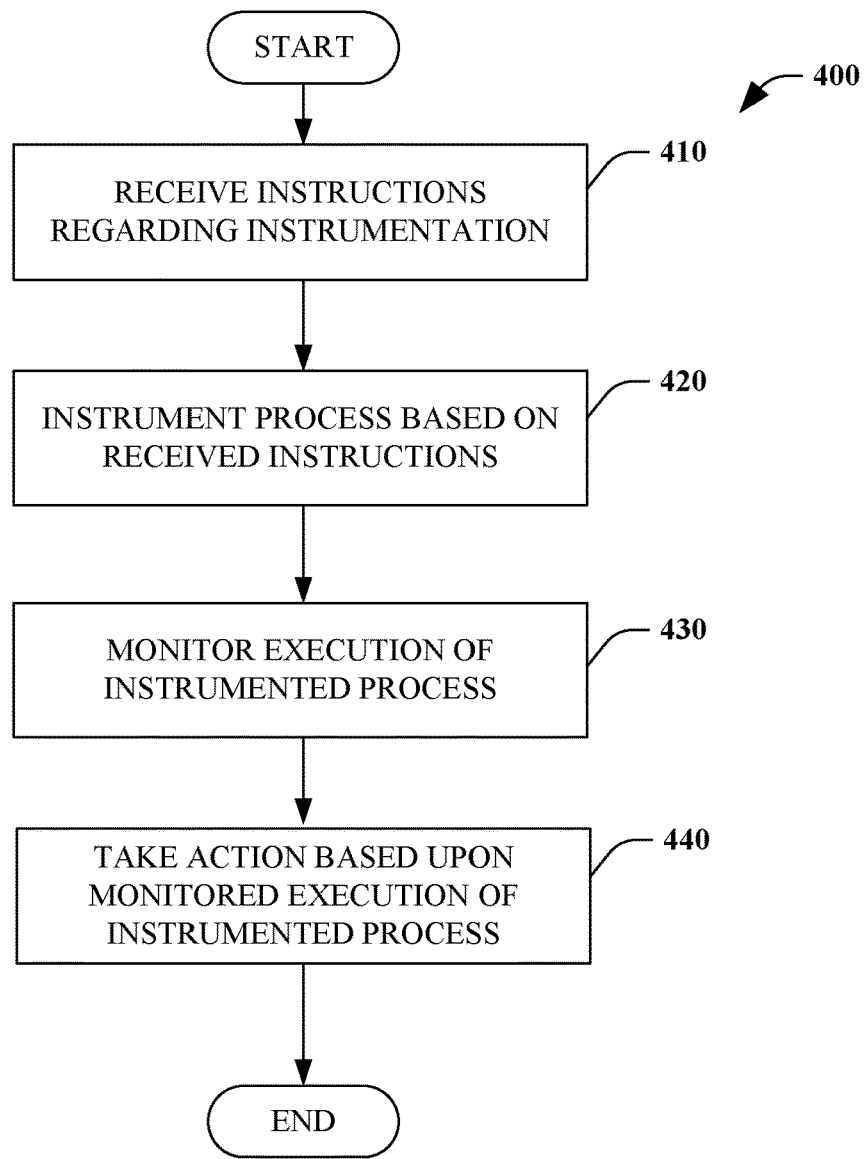
FIG. 4 illustrates an exemplary methodology of instrumenting a running process and monitoring its execution for detecting malicious code activity, on a client computer.

Turning to FIG. 4, an exemplary methodology 400 of instrumenting a running process and monitoring its execution for detecting malicious code activity, on a client computer is illustrated. At 410, instructions regarding instrumenting a process associated with a file are received, for example, from a service. At 420, a process is instrumented based on the received instructions. For example, an anti-malware engine can instrument the process according to configuration metadata (e.g., configuration setting(s)) included in the received instructions (e.g., from the service). For example, instrumenting a process can comprise injecting additional code prior to specific point(s) in execution of the file in the process. This instrumentation can trigger notification(s) when the process is about to perform and/or has performed certain action(s) (e.g., calling particular system function(s) such as API call(s)).

At 430, the instrumented process is monitored. At 440, an action is taken based upon the monitored execution of the instrumented process. For example, the anti-malware engine can enumerate range(s) of memory page(s) which are mapped into the process. The anti-malware engine can select certain memory page(s) and search the contents of the select memory page(s) against a database of known malicious code patterns.

In one example, another action that the anti-malware engine can take is to extract and log information related to an API call which triggered the notification. For example, extraction and logging may include details such as: API name, API parameters, stack trace (e.g., addresses of API callers). This logged information can be used to identify known malicious behavior pattern(s) and/or to adjust a way in which the process is monitored (e.g., enable or disable notification(s) for various API calls, adjust a selection of memory page(s) to be scanned, etc.).

Another example action that the anti-malware engine can take is to prevent the API call from being executed and/or change a result of the API call. Yet another example action that the anti-malware engine can take is to enable or disable notification(s) for a current API call, other API calls, and/or all API calls.

Additionally, if malware is detected in the instrumented process by the anti-malware engine by, for example, memory scan(s), logged information, matching a known malicious code pattern and/or observing malicious behavior, the anti-malware engine can take an action based upon configuration setting(s) (e.g., received from the service and/or stored locally). In one example, the anti-malware engine can report and/or remediate the malware (e.g., immediately), for example, by terminating the malicious process and/or performing other remediation step(s), as needed, depending on the malware. In one example, the anti-malware engine can assemble a detection report containing information regarding execution of the file in the instrumented process. For example, the detection report can include a file unique identifier, a unique identifier for a signature (e.g., known pattern) which triggered the detection, a detection method (e.g., to inform the service that malware was detected using a particular methodology). This detection report can be sent to the service.

Figure 5:
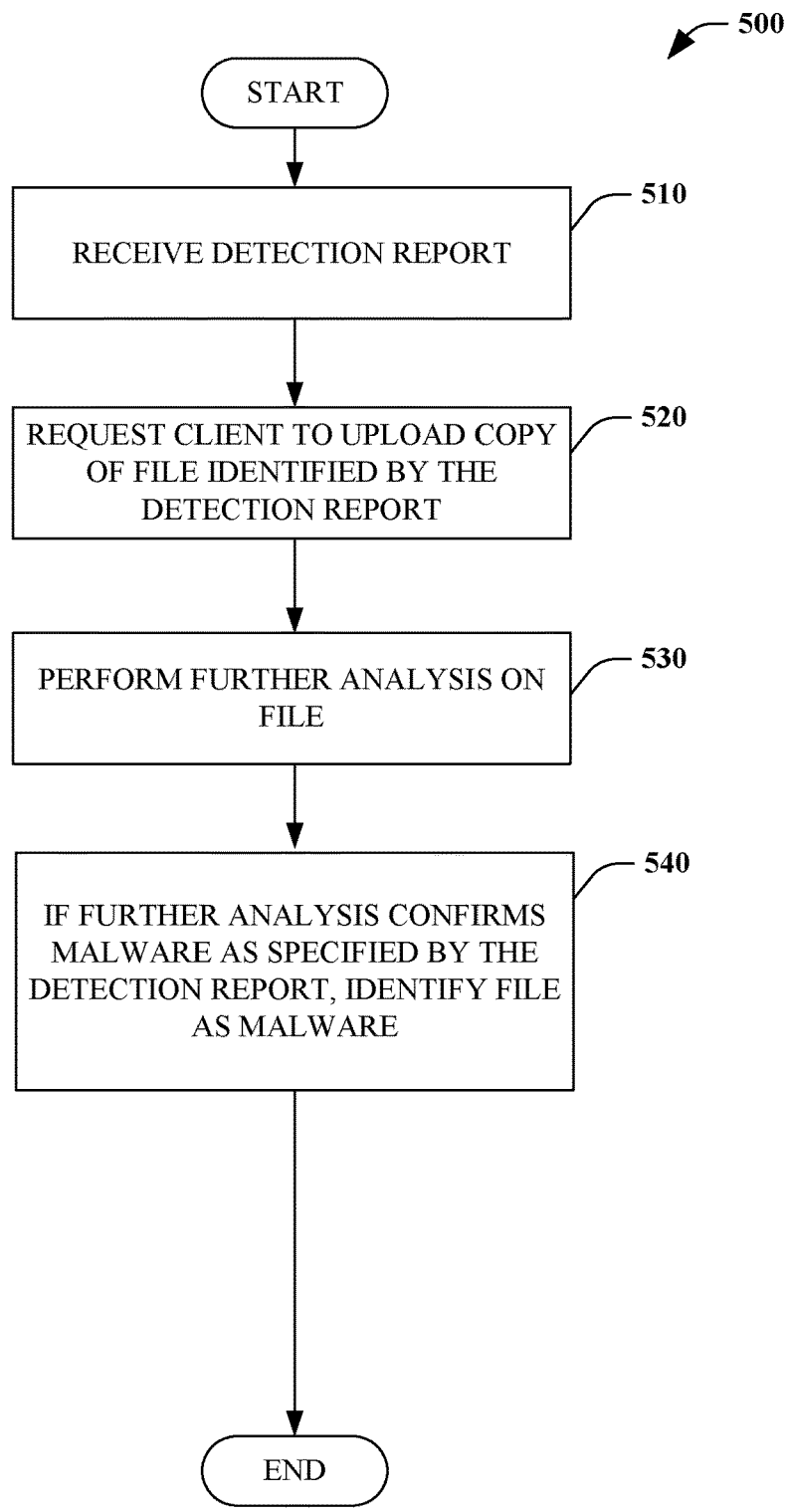
FIG. 5 illustrates an exemplary methodology of processing a detection report at a service.

Referring to FIG. 5, an exemplary methodology 500 of processing a detection report at a service is illustrated. At 510, a detection report is received, for example, from an anti-malware engine of a client computer. At 520, access to a file identified by the detection report is requested. For example, the service can request that the anti-malware engine upload a copy of the file to the service for further analysis by the service.

At 530, further analysis on the file can be performed by the service, for example, to independently confirm malware detection observed by the anti-malware engine. In one example, the service can analyze the file by executing the file in a controlled environment.

At 540, if the further analysis confirms malware as specified by the detection report, the service can identify the file as malware. For example, malware can be detected by the service while the file is executing in the controlled environment. In one example, the file and/or pattern(s) associated with the file are added to a database of known malware which is then available for use when the service is queried by other client computer(s).

Figure 6:
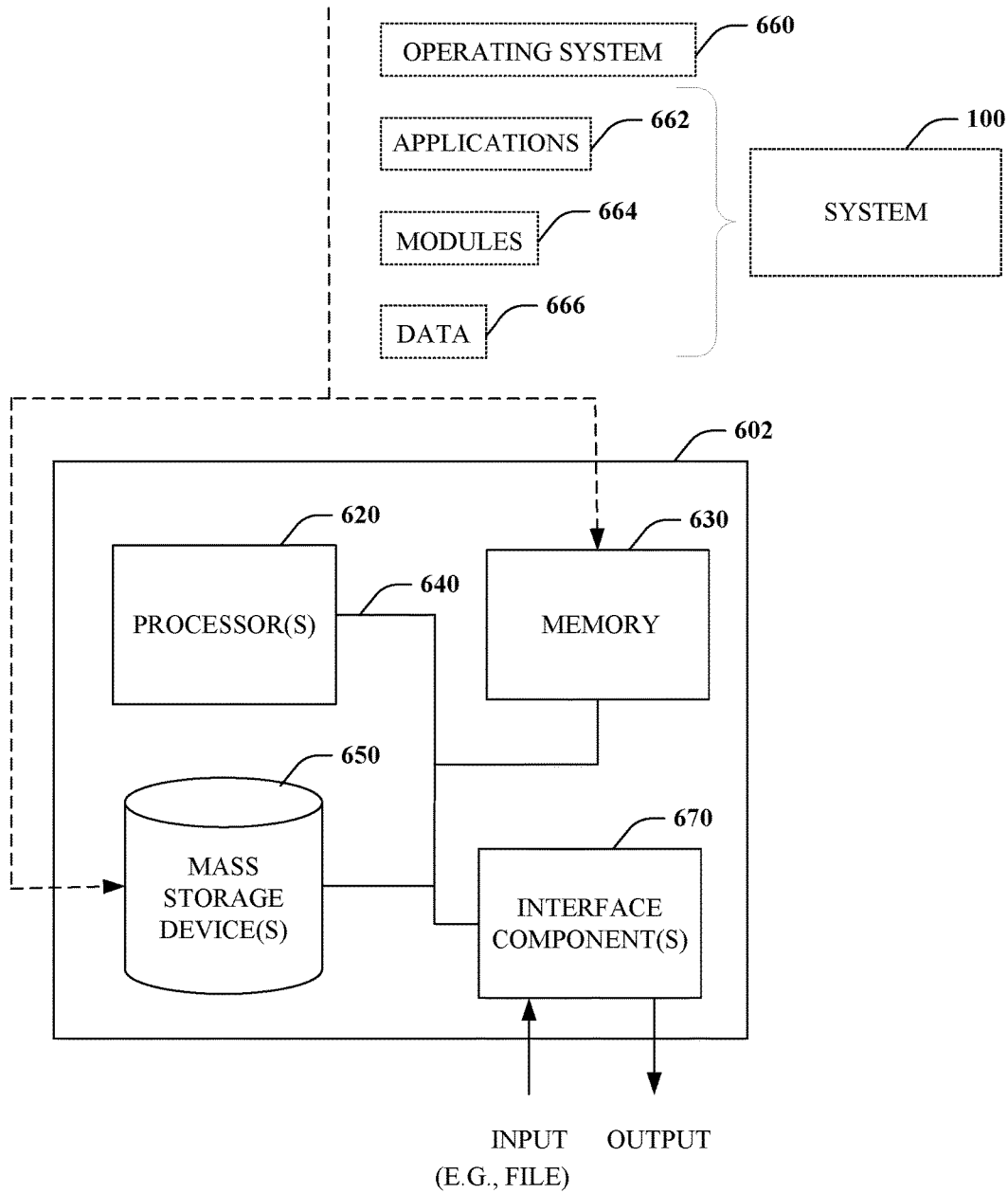
FIG. 6 is a functional block diagram that illustrates an exemplary computing system.

With reference to FIG. 6, illustrated is an example general-purpose computer or computing device 602 (e.g., desktop, laptop, tablet, watch, server, hand-held, programmable consumer or industrial electronics, set-top box, game system, compute node, etc.). For instance, the computing device 602 may be used in a system for detecting malware by monitoring execution of an instrumented process.

The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630. The instructions may be, for instance, instructions for implementing functionality described as being carried out by one or more components discussed above or instructions for implementing one or more of the methods described above.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 620 can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory, etc.) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but is not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 666. The operating system 660 acts to control and allocate resources of the computer 602. Applications 662 include one or both of system and application software and can exploit management of resources by the operating system 660 through program modules 664 and data 666 stored in memory 630 and/or mass storage device (s) 650 to perform one or more actions. Accordingly, applications 662 can turn a general-purpose computer 602 into a specialized machine in accordance with the logic provided thereby. In one example, application 662 includes key service component 160.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 662, and include one or more modules 664 and data 666 stored in memory and/or mass storage device(s) 650 whose functionality can be realized when executed by one or more processor(s) 620.

In accordance with one particular embodiment, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g., serial, parallel, PCMCIA, USB, FireWire, etc.) or an interface card (e.g., sound, video, etc.) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 670 can be embodied as an output peripheral interface to supply output to displays (e.g., LCD, LED, plasma, etc.), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for detecting malware by monitoring execution of an instrumented process, comprising:
    a client computer comprising a processor and a memory, the memory comprising:
        an anti-malware engine in communication with a anti-malware driver, the anti-malware engine configured to:
            prior to accessing a file in a process, scan the file;
            based upon the scan, determine that the file is suspicious;
            collect evidence used to determine that the file is suspicious;
            assemble a report of the collected evidence;
            provide the report to a service;
            receive instructions for instrumenting the process from the service, wherein the instructions comprise additional code to be injected prior to a specific point in execution of the file in the process, wherein the additional code triggers a notification when the process is at least one of about to perform a particular action or has performed another particular action;
            instrumenting the process based on the received instructions;
            receive the notification triggered by the instrumentation of the process, and
            take an action in response to the notification.

2. The system of claim 1, wherein the anti-malware driver executes within a protected area of an operating system of the client computer.

3. The system of claim 1, wherein the determination that the file is suspicious is based upon at least one of: the file comprising obfuscated code, the file comprising a suspicious pattern or an observation of suspicious behavior by the anti-malware engine.

4. The system of claim 1, wherein instrumenting the process comprises at least one of containing or restricting execution of the process.

5. The system of claim 1, wherein the action taken in response to the notification triggered by the instrumentation of the process comprises the anti-malware engine enumerating ranges of memory pages mapped into the process, selecting a particular memory page of the enumerated ranges and searching contents of the selected particular memory page against known malicious code patterns.

6. The system of claim 5, wherein the anti-malware engine tracks memory pages that have been searched and only searches those pages when content of a particular memory page has changed since a previous search.

7. The system of claim 1, the action taken in response to the notification comprises the anti-malware extracting and logging information related to an application programming interface call which triggered the notification.

8. The system of claim 7, wherein the information extracted and logged comprises at least one of an application programming interface name, an application programming interface parameter or an address of an application programming interface caller.

9. The system of claim 1, the action taken in response to the notification comprises preventing an application programming interface call that triggered the notification from being executed.

10. The system of claim 1, the action taken in response to the notification comprises changing a result returned from an application programming interface call that triggered the notification.

11. The system of claim 1, the action taken in response to the notification comprises determining the file to comprise malware by at least one of matching a known malicious code pattern or observing malicious behavior.

12. The system of claim 11, wherein the anti-malware engine further performs at least one of deleting the file, removing a registry key that the process added, restoring a change to a system setting that the file changed, terminating a malicious process based upon determining the file to comprise malware.

13. A method of detecting malware by monitoring execution of an instrumented process, comprising:
    receiving instructions for instrumenting a process from a service, wherein the instructions comprise additional code to be injected prior to a specific point in execution of the process into which a file is loaded, wherein the additional code triggers a notification when the process is at least one of about to perform a particular action or has performed another particular action;
    instrumenting the process based on the received instructions;
    based upon execution of the instrumented process, receiving the notification triggered by the instrumentation of the process; and
    performing an action in response to the notification.

14. The method of claim 13, the action performed in response to the notification comprises enumerating a range of memory pages mapped into the process, selecting a particular memory page of the enumerated range and searching contents of the particular memory page against known malicious code patterns.

15. The method of claim 13, the action performed in response to the notification comprises extracting and logging information related to an application programming interface call which triggered the notification.

16. The method of claim 13, the action performed in response to the notification comprises preventing an application programming interface call that triggered the notification from being executed.

17. The method of claim 13, the action performed in response to the notification comprises changing a result returned from an application programming interface call that triggered the notification.

18. The method of claim 13, the action performed in response to the notification comprises determining the file to comprise malware by at least one of matching a known malicious code pattern or observing malicious behavior.

19. A computer storage media storing computer-readable instructions that when executed cause a computing device to:
    receive instructions for instrumenting a process from a service, wherein the instructions comprise additional code to be injected prior to a specific point in execution of the process into which a file is loaded, wherein the additional code triggers a notification when the process is at least one of about to perform a particular action or has performed another particular action;
    instrument the process based on the received instructions;
    based upon execution of the instrumented process, receive the notification triggered by the instrumentation of the process; and
    perform an action in response to the notification.

20. The computer storage media of claim 19, the action performed in response to the notification triggered by instrumentation of the process comprises at least one of:
    enumerating a ranges of memory pages mapped into the process, based upon the configuration metadata, selecting particular memory pages of the enumerated range and searching contents of the selected particular memory pages against known malicious code patterns;
    extracting and logging information related to an application programming interface call which triggered the notification;
    preventing an application programming interface call that triggered the notification from being executed;
    changing a result returned from an application programming interface call that triggered the notification; or
    determining the file to comprise malware by at least one of matching a known malicious code pattern or observing malicious behavior.

* * * * *